(12) United States Patent
Miyamoto et al.

(10) Patent No.: US 11,691,621 B2
(45) Date of Patent: Jul. 4, 2023

(54) DRIVING SUPPORT APPARATUS INCLUDING COLLISION AVOIDANCE BRAKING CONTROL

(71) Applicant: TOYOTA JIDOSHA KABUSHIKI KAISHA, Toyota (JP)

(72) Inventors: Yuhei Miyamoto, Toyota (JP); Kohei Morotomi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 61 days.

(21) Appl. No.: 17/072,518

(22) Filed: Oct. 16, 2020

(65) Prior Publication Data

US 2021/0179093 A1    Jun. 17, 2021

(30) Foreign Application Priority Data

Dec. 16, 2019    (JP) .................. 2019-226330

(51) Int. Cl.
  *B60W 30/12*    (2020.01)
  *B60W 30/09*    (2012.01)
  (Continued)

(52) U.S. Cl.
  CPC ............ *B60W 30/09* (2013.01); *B60W 10/18* (2013.01); *B60W 30/0956* (2013.01);
  (Continued)

(58) Field of Classification Search
  CPC .. B60W 30/09; B60W 10/18; B60W 30/0956; B60W 30/18163;
  (Continued)

(56) References Cited

U.S. PATENT DOCUMENTS 9,105,190 B2    8/2015 Akiyama
9,393,960 B2    7/2016 Kodaira
(Continued)

FOREIGN PATENT DOCUMENTS

JP    2007099237 A   *  4/2007
JP    2012-116403 A     6/2012
(Continued)

*Primary Examiner* — Donald J Wallace
*Assistant Examiner* — Daniel M. Robert
(74) *Attorney, Agent, or Firm* — Sughrue Mion, PLLC

(57) ABSTRACT

A driving support apparatus comprises a controller for performing collision avoidance braking control and lane deviation suppressing control. When a performing condition of the lane deviation suppressing control is satisfied at a timing of the collision avoidance braking control is about to be performed, the controller makes direction determination processing for determining whether or not the own vehicle travels to a direction toward which it will collide with a target object or to a direction toward which it will avoid colliding with the target object. In the direction determination processing, when it is determined the own vehicle travels to a collision direction, the controller stops the lane deviation suppressing control to perform the collision avoidance braking control, and when it is determined the own vehicle travels to a collision avoidance direction, the controller performs cooperative control for making the lane deviation suppressing control cooperate with the collision avoidance braking control.

4 Claims, 9 Drawing Sheets

(51) Int. Cl.
*B60W 30/095* (2012.01)
*B60W 30/18* (2012.01)
*B60W 10/18* (2012.01)
*G06V 20/58* (2022.01)
*G06V 20/56* (2022.01)

(52) U.S. Cl.
CPC ....... *B60W 30/18163* (2013.01); *G06V 20/58* (2022.01); *G06V 20/588* (2022.01); *B60W 2520/06* (2013.01)

(58) Field of Classification Search
CPC ......... B60W 2520/06; B60W 2552/53; B60W 10/20; B60W 30/12; G06V 20/58; G06V 20/588; B60Q 9/008; B60T 7/22; G08G 1/165; G08G 1/166
See application file for complete search history.

(56) References Cited

U.S. PATENT DOCUMENTS

| | | | |
|---|---|---|---|
| 9,405,727 B2 | 8/2016 | Nagata | |
| 9,483,945 B2 | 11/2016 | Okita et al. | |
| 9,669,760 B2 | 6/2017 | Hanita et al. | |
| 9,873,412 B2 | 1/2018 | Moriizumi | |
| 9,898,929 B2 | 2/2018 | Harada et al. | |
| 9,965,955 B2 | 5/2018 | Fujishiro | |
| 10,083,547 B1* | 9/2018 | Tomatsu | G08G 1/09675 |
| 10,793,147 B2 | 10/2020 | Kaminade et al. | |
| 10,946,830 B2 | 3/2021 | Sawai et al. | |
| 11,175,673 B2 | 11/2021 | Eshima | |
| 2010/0222976 A1* | 9/2010 | Haug | B60W 30/12 340/439 |
| 2011/0022317 A1* | 1/2011 | Okita | B60W 30/12 701/301 |
| 2012/0226392 A1 | 9/2012 | Kataoka | |
| 2014/0297172 A1* | 10/2014 | Huelsen | G08G 1/167 701/301 |
| 2015/0149039 A1* | 5/2015 | Fu | B62D 15/025 701/41 |
| 2017/0029026 A1* | 2/2017 | Okuda | B62D 15/025 |
| 2017/0166254 A1 | 6/2017 | Katoh | |
| 2018/0046191 A1* | 2/2018 | Keller | B60W 30/10 |
| 2019/0061769 A1* | 2/2019 | Panse | B60W 30/00 |
| 2019/0291747 A1* | 9/2019 | Chiba | G08G 1/16 |
| 2021/0179093 A1* | 6/2021 | Miyamoto | B60W 30/0956 |

FOREIGN PATENT DOCUMENTS

| | | | |
|---|---|---|---|
| JP | 2012116403 A | * | 6/2012 |
| JP | 2014-142965 A | | 8/2014 |
| JP | 2015-205558 A | | 11/2015 |
| JP | 2017-030472 A | | 2/2017 |
| JP | 2017-105383 A | | 6/2017 |

\* cited by examiner

DRIVING SUPPORT APPARATUS INCLUDING COLLISION AVOIDANCE BRAKING CONTROL

TECHNICAL FIELD

The present invention relates to a driving support apparatus capable of performing collision avoidance braking control and lane deviation suppressing control.

BACKGROUND ART

A driving support apparatus capable of performing collision avoidance braking control and lane deviation suppressing control as driving support control has been conventionally known. The collision avoidance braking control is control for automatically applying braking force to an own vehicle when a three-dimensional object with a high probability of the own vehicle colliding with has been detected in front of the own vehicle by means of sensors such as a camera and/or a radar etc. (hereinafter, such a three-dimensional object may be also referred to as a "target object") (for example, refer to Japanese Patent Application Laid-Open (kokai) No. 2012-116403).

On the other hand, the lane deviation suppressing control is control for detecting a lane (hereinafter, may be also referred to as a "travelling lane") on which the own vehicle is travelling by means of the camera and automatically change a steered angle of each of steered wheels of the own vehicle so that the own vehicle travels in (within) the travelling lane along the travelling lane when it is highly likely that the own vehicle deviates from the travelling lane or when the own vehicle has already deviated from the travelling lane (for example, refer to Japanese Patent Application Laid-Open (kokai) No. 2014-142965).

SUMMARY OF THE INVENTION

The collision avoidance braking control and the lane deviation suppressing control are independent controls with each other and are performed when each of performing conditions thereof has been satisfied. Therefore, when a performing condition of one control has been satisfied in a midst of the other control being performed after a performing condition thereof is satisfied (strictly, including a case when the performing conditions of both of the controls have been satisfied at the same time), one control is performed in addition to the other control. In this case, depending on a positional relationship between a target object and the travelling lane, there may be a case where the steered wheels are steered by the lane deviation suppressing control in such a manner that the own vehicle travels along the travelling lane, and as a result, the own vehicle travels toward the target object, causing to reduce collision avoidance effect by the collision avoidance braking control.

Hence, this type of driving support apparatus may be configured to stop (prohibit) the lane deviation suppressing control and perform the collision avoidance braking control under a situation where both of the lane deviation suppressing control and the collision avoidance braking control may be performed. According to such a driving support apparatus, the lane deviation suppressing control will not be performed while the collision avoidance braking control is being performed, and thus it can be suppressed that the collision avoidance effect reduces due to the lane deviation suppressing control.

However, depending on the positional relationship between a target object and a lane, there also may be a case where the collision avoidance effect improves when the lane deviation suppressing control is performed in combination with the collision avoidance braking control. The driving support apparatus mentioned above stops (prohibits) the lane deviation suppressing control even in such a case, and therefore it is impossible to make use of the lane deviation suppressing control in order to improve the collision avoidance effect.

The present invention is made to resolve the problem above. That is, one of objects of the present invention is to provide, for a driving support apparatus capable of performing collision avoidance braking control and lane deviation suppressing control, technique capable of make the lane deviation suppressing control properly cooperate with the collision avoidance braking control.

A driving support apparatus (hereinafter, referred to as a "present invention apparatus") comprising:

an object information acquiring apparatus (11) configured to detect a three-dimensional object present in front of an own vehicle and a lane on which the own vehicle is travelling and to acquire information indicating the detected three-dimensional object and lane as object information; and a controller (10) configured to perform collision avoidance braking control for automatically applying braking force to the own vehicle when it is determined, based on the object information, that the own vehicle is highly likely to collide with the detected three-dimensional object (S530: Yes) and lane deviation suppressing control for automatically changing a steered angle of steered wheels of the own vehicle such that the own vehicle travels in the lane when a deviation suppressing control performing condition is satisfied, the deviation suppressing control performing condition being a condition satisfied when it is determined, based on the object information, that the own vehicle is highly likely to deviate from the detected lane (w/2<Ds<Dsth) and/or a condition satisfied when it is determined, based on the object information, that the own vehicle has deviated from the detected lane (Ds≤w/2), wherein, the controller (10) is configured to:

when the deviation suppressing control performing condition is satisfied (S535: Yes) in a case when it is determined that the own vehicle is highly likely to collide with the detected three-dimensional object (S530: Yes), execute direction determination processing (S545) for determining whether or not a steered direction of the steered wheels by the lane deviation suppressing control is same as a collision avoidance direction toward which the own vehicle will avoid colliding with the three-dimensional object, when it is determined that the steered direction is different from the collision avoidance direction (S545: No), stop the lane deviation suppressing control (S550) and perform the collision avoidance braking control (S540), and when it is determined that the steered direction is same as the collision avoidance direction (S545: Yes), perform both of the collision avoidance braking control and the lane deviation suppressing control (S540).

In the present invention apparatus, when the deviation suppressing control performing condition is satisfied in a case when it is determined that the own vehicle is highly likely to collide with the three-dimensional object detected by the object information acquiring apparatus (in other words, a case when the collision avoidance braking control is about to be performed), the direction determination processing is executed by the controller. The direction determination processing is processing for determining, provided that steered wheels are turned by the lane deviation suppressing control, whether or not the steered direction is same as a collision avoidance direction (a direction toward which the own vehicle will avoid colliding with the detected three-dimensional object).

Here, "the steered direction is different from the collision avoidance direction" in the present specification means that "provided that the steered wheels are turned by the lane deviation suppressing control, the own vehicle travels to a direction toward which the own vehicle will collide with the target object (hereinafter, may be also referred to as a "collision direction")". Therefore, when the steered direction is different from the collision avoidance direction, it is highly likely that the collision avoidance effect is reduced owing to the lane deviation suppressing control. According to the present invention apparatus, in such a case, the lane deviation suppressing control is stopped and the collision avoidance braking control is performed. Hence, it can be suppressed that the collision avoidance effect is reduced owing to the lane deviation suppressing control.

In addition, "the steered direction is same as the collision avoidance direction" in the present specification means that "provided that the steered wheels are turned by the lane deviation suppressing control, the own vehicle travels to the collision avoidance direction". Therefore, when the steered direction is same as the collision avoidance direction, it is highly likely that the collision avoidance effect is improved thanks to the lane deviation suppressing control. According to the present invention apparatus, in such a case, both of the collision avoidance braking control and the lane deviation suppressing control are performed. Therefore, the collision avoidance effect can be improved thanks to the lane deviation suppressing control.

As mentioned above, according to the present invention apparatus, it becomes possible to make the lane deviation suppressing control properly cooperate with the collision avoidance braking control based on the direction determination processing.

Another aspect of the present invention further comprising a steering index value detector (12) for detecting steering related values ($\theta s$, $\omega s$) having correlation with force input to a steering wheel by a driver of the own vehicle, wherein, the controller (10) is configured to, when a steering override condition where the steering related values ($\theta s$, $\omega s$) are more than or equal to predetermined steering related thresholds ($\theta sth$, $\omega sth$) while the collision avoidance breaking control and/or the lane deviation suppressing control are/is being performed becomes satisfied, perform steering override for finishing the corresponding collision avoidance braking control and/or lane deviation suppressing control to prioritize steering operation by the driver, the controller further sets the steering related thresholds ($\theta sth$, $\omega sth$) to first steering related thresholds ($\theta s1th$, $\omega s1th$), and when it is determined in the direction determination processing that the steered direction is same as the collision avoidance direction (S545: Yes), the controller is configured to change (S560) the steering related thresholds ($\theta sth$, $\omega sth$) to second steering related thresholds ($\theta s2th$, $\omega s2th$) larger than the first steering related thresholds ($\theta s1th$, $\omega s1th$).

When it is determined in the direction determination processing that the steered direction is the same as the collision avoidance direction, the lane deviation suppressing control is cooperatively performed with the collision avoidance braking control, and thus the steered wheels are steered. When the steered wheels are turned, the driver tends to rotate (operate) the steering wheel to a direction corresponding to the steered direction of the steered wheels in order to avoid colliding with the target object. In this case, if the steering related thresholds remain as the first steering related thresholds, the steering override condition may become satisfied by the steering operation by the driver, and as a result, the collision avoidance braking control and the lane deviation suppressing control may be finished halfway (in the middle). In such a case, if the steering operation by the driver is insufficient, a possibility that the own vehicle cannot avoid the collision with the target object becomes high, and thus it is likely that the collision avoidance effect by the collision avoidance braking control and the lane deviation suppressing control cannot be adequately obtained.

Therefore, in another aspect of the present invention, when it is determined in the direction determination processing that the steered direction is the same as the collision avoidance direction, the steering related thresholds are increased from the first steering related thresholds to the second steering related thresholds. Accordingly, the steering override condition becomes harder to be satisfied even when the driver conducts the steering operation, and the collision avoidance braking control and the lane deviation suppressing control are highly likely to be performed to the end. Therefore, it can be suppressed that the collision avoidance effect is reduced owing to the steering operation by the driver.

In another aspect of the present invention, the controller (10) is configured to, in the direction determination processing:

determine, based on the object information, whether or not the detected three-dimensional object is positioned in the detected lane, when it is determined that the detected three-dimensional object is positioned in the lane (S545: No), determine that the steered direction is different from the collision avoidance direction, and when it is determined that the detected three-dimensional object is positioned outside the lane (S545: Yes), determine that the steered direction is same as the collision avoidance direction.

When the target object is positioned in the lane, there is a possibility that the own vehicle travels to the collision direction if the lane deviation suppressing control is performed. Therefore, in another aspect of the present invention, when it is determined in the direction determination processing that the target object is positioned in the lane, it is determined that the steered direction is different from the collision avoidance direction. That is, the lane deviation suppressing control is stopped and the collision avoidance braking control is performed. On the other hand, when the target object is positioned outside the lane, the own vehicle is highly likely to travel to the collision avoidance direction if the lane deviation suppressing control is performed. Therefore, in another aspect of the present invention, when it is determined in the direction determination processing that the target object is positioned outside the lane, it is determined that the steered direction is same as the collision avoidance direction. That is, the lane deviation suppressing control is cooperatively performed with the collision avoidance braking control. As described above, the direction determination processing is executed by determining whether or not the steered direction is the same as the collision avoidance direction based on the determination result of whether or not the target object is positioned in the lane. Therefore, the direction determination processing can be properly executed.

In addition, whether or not the target object is positioned in the lane can be precisely determined based on the object information. Therefore, the direction determination processing can be executed based on a clear criterion.

In the above description, references used in the following descriptions regarding embodiments are added with parentheses to the elements of the present invention, in order to assist in understanding the present invention. However, those references should not be used to limit the scope of the invention.

DESCRIPTION OF THE EMBODIMENT

Figure 1:
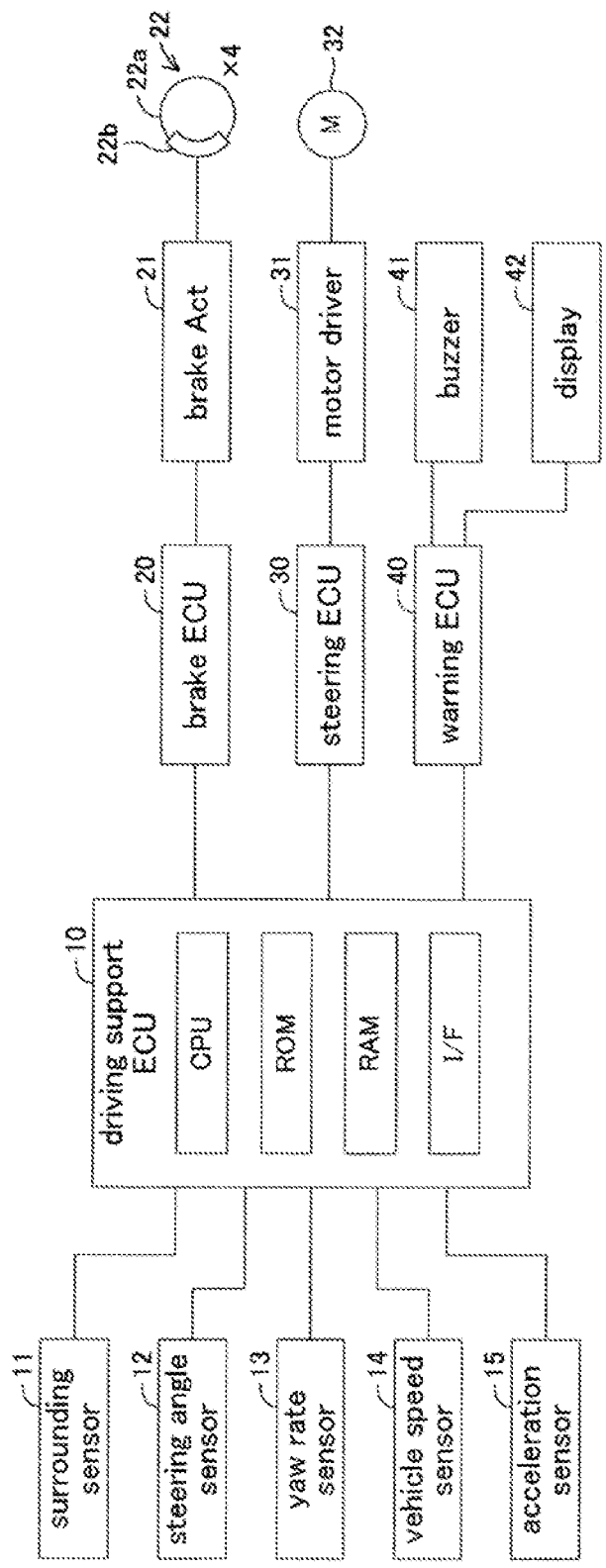
FIG. 1 is a schematic configuration diagram of a driving support apparatus according to an embodiment of the present invention.

A driving support apparatus according to an embodiment of the present invention (hereinafter, may be also referred to as a "present embodiment apparatus") will be described below, referring to figures. As shown in FIG. 1, the present embodiment apparatus comprises driving support ECU 10, brake ECU 20, steering ECU 30, and warning ECU 40. Each of the ECUs 10, 20, 30, and 40 comprises a microcomputer as a main component and is connected to each other in such a manner that they can mutually exchange data (communicate) via a non-illustrated CAN (Controller Area Network). It should be noted that ECU is an abbreviation of Electronic Control Unit. The microcomputer includes CPU, ROM, RAM, interfaces, and the like. The CPU realizes (performs) various functions (mentioned later) by executing instructions (i.e. programs, routines) stored in the ROM. Some of or all of the ECUs 10, 20, 30, and 40 may be integrated to one ECU as a controller. Hereinafter, a vehicle to which the present embodiment apparatus is applied may be referred to as an "own vehicle".

The driving support ECU 10 is connected to a surrounding sensor 11, a steering angle sensor 12, a yaw rate sensor 13, a vehicle speed sensor 14, and an acceleration sensor 15, and is configured to receive an output signal and a detection signal from each of these sensors every time a predetermined interval elapses. Hereinafter, the driving support ECU may be also simply referred to as "ECU 10".

The surrounding sensor 11 has function for acquiring information at least on "a road in front of the own vehicle and a three-dimensional object(s) present on the road". The three-dimensional object includes a moving object (a vehicle, a pedestrian, a bicycle, and the like) and a fixed object (a guardrail, a sidewall, a medial divider, a street tree, and the like).

The surrounding sensor 11 comprises a radar sensor and a camera sensor. The radar sensor emits an electric wave in a millimeter waveband to a surrounding of the own vehicle (including at least a front region thereof), and when a three-dimensional object exists, receives a reflected wave from this three-dimensional object, and calculates, based on an emitting timing and a receiving timing of the electric wave, and the like, whether or not a three-dimensional object exists and a relative relationship between the own vehicle and the three-dimensional object (a distance from the own vehicle to the three-dimensional object, a direction of the three-dimensional object with respect to the own vehicle, a relative speed of the three-dimensional object with respect to the own vehicle, and the like). The camera sensor comprises a stereo camera. The camera sensor takes an image of scenery of a left side region and a right side region in front of the own vehicle and calculates, based on left and right image data captured, a shape of a road (includes a curvature of the road), whether or not a three-dimensional object exists, and a relative relationship between the own vehicle and the three-dimensional object. The camera sensor recognizes, based on the image data mentioned above, a lane marker including left and right white lines of a road. A shape of a road can be calculated based on this lane marker. That is, the surrounding sensor 11 detects a three-dimensional object present in front of the own vehicle as well as a lane(s) (a region(s) defined by the left and right white lines). It should be noted that the lane detected by the surrounding sensor 11 also includes a lane on which the own vehicle is travelling (travelling lane). The surrounding sensor 11 corresponds to one example of an "object information acquiring apparatus".

The information acquired by the surrounding sensor 11 may be referred to as object information. The surrounding sensor 11 transmits the object information to the ECU 10. It should be noted that the surrounding sensor 11 does not necessarily have to comprise the radar sensor as well as the camera sensor. For example, the surrounding sensor 11 may comprise only the camera sensor. The camera sensor may be a monocular (single-lens) camera. In addition, the information on a shape of a road may be acquired by means of navigation system (illustration omitted).

The steering angle sensor 12 detects a steering angle of a steering wheel of the own vehicle (in other words, a rotation angle of a steering shaft to which the steering wheel is directly connected) and transmits a detection signal to the ECU 10. The yaw rate sensor 13 detects a yaw rate of the own vehicle and transmits a detection signal to the ECU 10. The vehicle speed sensor 14 detects a travelling speed of the own vehicle (hereinafter, referred to as a "vehicle speed") and transmits a detection signal to the ECU 10. The acceleration sensor 15 detects a front-rear acceleration which is an acceleration acting in a front-rear direction of the own vehicle as well as a lateral acceleration which is an acceleration acting in a left-right direction of the own vehicle (a vehicle width direction), and transmits those detection signals to the ECU 10. It should be noted that the vehicle speed sensor 14 calculates a vehicle speed based on a count value calculated by counting a number of pulse signals of a wheel speed sensor provided at each of wheels of the own vehicle, and thus the signal of the wheel speed sensor instead of the vehicle speed sensor 14 may be transmitted to the ECU 10. The steering angle sensor 12 corresponds to one example of a "steering index value detector".

The brake ECU 20 is connected to a brake actuator 21. The brake actuator 21 is provided in a hydraulic circuit between a non-illustrated master cylinder to compress operating fluid with a pedaling force of a brake pedal and a friction brake mechanism 22 provided at each wheel. Each of the friction brake mechanisms 22 comprises a brake disc 22a fixed to the wheel and a brake caliper 22b fixed to a vehicle body. Each of the friction brake mechanisms 22 operates a wheel cylinder which is built in the brake caliper 22b by a hydraulic pressure of the operating fluid that is supplied from the brake actuator 21, and thereby presses a brake pad onto the brake disc 22a to generate friction braking force.

The ECU 10 is configured to be capable of transmitting a braking instruction (described later) to the brake ECU 20. When receiving the braking instruction, the brake ECU 20 drives (controls) the brake actuator 21 in response to this instruction. Accordingly, the ECU 10 can automatically applying the braking force to the own vehicle via the brake ECU 20.

The steering ECU 30 is a control apparatus of a well-known electrically-driven power steering system and is connected to a motor driver 31. The motor driver 31 is connected to a steered motor 32. The steered motor 32 is incorporated into a steering mechanism (illustration omitted). The steered motor 32 generates torque with electric power supplied from the motor driver 31 and with the torque, can generate steering assist torque or can turn left-and-right steered wheels.

Specifically, the steering ECU 30 drives the steered motor 32 based on steering torque detected by steering operation (operation of the steering wheel) by a driver, and thereby applies the steering assist torque to the steering mechanism to assist the driver in the steering operation.

In addition, the ECU 10 is configured to be capable of transmitting a steering instruction (described later) to the steering ECU 30. When receiving the steering instruction, the steering ECU 30 drives (controls) the steered motor 32 in response to this instruction. Accordingly, the ECU 10 can automatically change the steered angle of the steered wheel via the steering ECU 30 (that is, without the steering operation by the driver).

The warning ECU 40 is connected to a buzzer 41 and a display 42. The display 42 is a multi-information display and is provided at a position recognizable for the driver.

The ECU 10 is configured to be capable of transmitting a warning instruction (described later) to the warning ECU 40. When receiving the warning instruction, the warning ECU 40, in response to this instruction, sounds the buzzer 41 as well as display on the display 42 a message and/or a mark peculiar to each driving support control (mentioned later). Accordingly, the ECU 10 can warn the driver via the warning ECU 40.

Next, a description regarding the ECU 10 will be made. The present embodiment apparatus is configured to be capable of performing collision avoidance control, lane deviation suppressing control, and steering override as driving support control. The ECU 10 functions as a main part to determine whether or not to perform these controls.

First, processing of the ECU 10 concerning the collision avoidance control will be described. The collision avoidance control is control for warning the driver when a three-dimensional object with a probability of the own vehicle colliding with has been detected in front of the own vehicle, and for warning the driver as well as automatically applying the braking force to the own vehicle when a three-dimensional object with a "high" probability of the own vehicle colliding with has been detected in front of the own vehicle. The ECU 10 generates, based on the object information, the information on a three-dimensional object and a lane every time a predetermined time elapses. Specifically, the ECU 10 sets an origin at a central position of a front edge of the own vehicle, and generates coordinate information (positional information) of the three-dimensional object and the lane using a coordinate system expanding in the left-right direction and in a front direction from the origin. Accordingly, the ECU 10 calculates a shape of the travelling lane defined by the left and right white lines, a position and an orientation (direction) of the own vehicle in the travelling lane, and a relative position of the three-dimensional object with respect to the own vehicle.

The ECU 10 calculates a turning radius of the own vehicle based on a yaw rate detected by the yaw rate sensor 13 and a vehicle speed detected by the vehicle speed sensor 14, and calculates a trajectory of the own vehicle based on this turning radius. The ECU 10 makes a collision determination for determining, based on the position of the three-dimensional object and the trajectory of the own vehicle, whether or not the own vehicle will collide with the three-dimensional object when the own vehicle keeps travelling under a current travelling state. It should be noted that when the three-dimensional object is a moving object, the ECU 10 calculates a trajectory of the three-dimensional object, and makes the collision determination based on the trajectory of the three-dimensional object and the trajectory of the own vehicle.

When the ECU 10 determines that the own vehicle will collide with the three-dimensional object by the collision determination, the ECU 10 calculates a time to collision (hereinafter, may be also simply referred to as a "TTC") in accordance with a following expression (1) based on a distance L from the own vehicle to the three-dimensional object and a relative speed Vr of the three-dimensional object with respect to the own vehicle, where TTC is an expected time (a remaining time to a collision) for the own vehicle to collide with a three-dimensional object.

$$TTC=L/Vr \qquad (1)$$

When the TTC is less than or equal to a predetermined warning determination threshold TTCath, the ECU 10 determines that it is likely that the own vehicle collide with the three-dimensional object, and when the TTC is less than or equal to a predetermined braking determination threshold TTCbth, the ECU 10 determines that it is highly likely that the own vehicle collides with the three-dimensional object. That is, when the TTC is less than or equal to the braking determination threshold TTCbth, the ECU 10 detects a "three-dimensional object with a high probability of the own vehicle colliding with (i.e., a target object)". The braking determination threshold TTCbth is smaller than the warning determination threshold TTCath. Hereinafter, they will be described in order.

When the ECU 10 determines that it is likely that the own vehicle collides with the three-dimensional object (that is, TTC≤TTCath is satisfied), the ECU 10 transmits the warning instruction to the warning ECU 40. When receiving the warning instruction, the warning ECU 40 sounds the buzzer 41 as well as displays on the display 42 a predetermined message and/or mark. Accordingly, the warning to the driver is conducted. Hereinafter, among the collision avoidance control, the above-mentioned control which is performed via the warning ECU 40 when the TTC is less than or equal to the warning determination threshold TTCath will be especially referred to as "collision avoidance warning control". The collision avoidance warning control is performed by the ECU 10 transmitting the warning instruction to the warning ECU 40 and the warning ECU 40 controlling the buzzer 41 and the display 42 in response to this instruction. Therefore, hereinafter, a description of "the ECU 10 performs the collision avoidance warning control" may be used for convenience sake.

On the other hand, when the ECU 10 determines that it is highly likely that the own vehicle collides with the three-dimensional object (that is, TTC≤TTCbth is satisfied), the ECU 10 calculates a target deceleration for decelerating the own vehicle. For example, in a case when the target object is under a stopping state, regulate that a current relative speed (equal to the vehicle speed in this example) is V, a current deceleration (acceleration with a negative value) of the own vehicle is a, and a time for the own vehicle to stop is t, and then a travelling distance X for the own vehicle to stop can be expressed by a following expression (2).

$$X = V \cdot t + (1/2) \cdot a \cdot t^2 \quad (2)$$

In addition, the time t can be expressed by a following expression (3).

$$t = -V/a \quad (3)$$

When substituting the expressing (2) with the expression (3), a deceleration areq required for the own vehicle to stop at a travelling distance D can be expressed by a following expression (4).

$$a\text{req} = -V^2/2D \quad (4)$$

In order to stop the own vehicle before the target object by a distance β, this travelling distance D may be set to a distance (L−β) which is acquired by subtracting the distance β from the distance L. It should be noted that when the target object is a moving object, the deceleration areq may be calculated by using a relative speed and a relative deceleration (a relative acceleration with a negative value) of the own vehicle with respect to the target object.

The ECU 10 sets the deceleration areq calculated in this way as a target deceleration. However, in general, a deceleration generated by a vehicle has a limit (for example, around −1G), and thus when an absolute value of the deceleration areq exceeds an upper limit value, the ECU 10 sets a predetermined upper limit value as the target deceleration. The ECU 10 transmits the braking instruction indicating the target deceleration to the brake ECU 20. When receiving the braking instruction, the brake ECU 20 controls the brake actuator 21 in accordance with the target deceleration to generate the friction braking force at each wheel. Accordingly, the braking force is automatically applied to the own vehicle (that is, the automatic brake is operated), and the own vehicle is decelerated. Hereinafter, among the collision avoidance control, the above-mentioned control which is performed via the brake ECU 20 when the TTC is less than or equal to the braking determination threshold TTCbth will be especially referred to as "collision avoidance braking control". That is, the collision avoidance control includes the collision avoidance warning control and the collision avoidance braking control. The collision avoidance braking control is performed by the ECU 10 transmitting the braking instruction to the brake ECU 20 and the brake ECU 20 controlling the brake actuator 21 in response to this instruction. Therefore, hereinafter, a description of "the ECU 10 performs the collision avoidance braking control" may be used for convenience sake.

Figure 2:
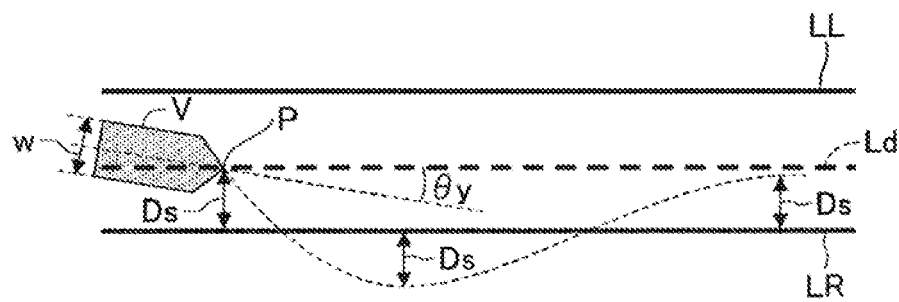
FIG. 2 is a plan view showing a left white line LL, a right white line LR, a side distance Ds, and a yaw angle θy when lane deviation suppressing control is performed.

Next, processing of the ECU 10 concerning the lane deviation suppressing control will be described. The lane deviation suppressing control is control for warning the driver as well as automatically change a steered angle of each of the steered wheels of the own vehicle so that the own vehicle travels in (within) the travelling lane (along this travelling lane) when a deviation suppressing control performing condition is satisfied, where the deviation suppressing control performing condition includes a condition satisfied when it is determined that the own vehicle is highly likely to deviate from the travelling lane and a condition satisfied when it is determined that the own vehicle deviates from the travelling lane. The ECU 10 calculates, based on the object information, a shape of the travelling lane, and a position and an orientation (direction) of the own vehicle in the travelling lane. For example, as shown in FIG. 2, the ECU 10 determines a line passing through a center of left and right white lines LL, LR in a lane width direction as a reference line Ld. The ECU 10 calculates a yaw angle θy and a side distance Ds every time the predetermined time elapses. The yaw angle θy is an angle formed by a direction of the reference line Ld and a travelling direction of the own vehicle V. Hereinafter, among the left white line LL and the right white line LR, a white line from which the own vehicle is highly likely to deviate and a white line from which the own vehicle has deviated may be also referred to as a "target white line". The side distance Ds is a distance between a front edge central position P (hereinafter, referred to as a "position P") of the own vehicle V and the target white line (the right white line LR in FIG. 2) in the lane width direction.

When the position P is positioned inside the target white line, the side distance Ds is calculated as a positive value. In this case, the side distance Ds increases as the position P moves inward from the target white line. When the position P is positioned on and outside the target white line, the side distance Ds is calculated as a value less than or equal to zero. In this case, the side distance Ds decreases as the position P moves outward from the target white line. Consider a case when the side distance Ds becomes less than a predetermined deviation determination threshold Dsth. In this case, when the side distance Ds is larger than a half of a vehicle width w of the own vehicle V (w/2<Ds<Dsth), the ECU 10 determines that the own vehicle is highly likely to deviate from the travelling lane, and when the side distance Ds is less than or equal to the half of the vehicle width w (Ds≤w/2), the ECU 10 determines that the own vehicle has already deviated from the travelling lane. That is, the performing condition of the lane deviation suppressing control is satisfied when Ds<Dsth is satisfied.

When the ECU 10 determines that the own vehicle is highly likely to deviate from the travelling lane and when the own vehicle has already deviated from the travelling lane, the ECU 10 calculates a target lateral acceleration Gy in accordance with a following expression (5).

$$Gy = K1 \times Ds' + K2 \times \theta y \quad (5)$$

Here, the target lateral acceleration Gy is a lateral acceleration set in such a manner that the own vehicle will not deviate outside from the white line. When the own vehicle turns in a clockwise direction, the target lateral acceleration Gy is calculated as a positive value, and when the own vehicle turns in an anticlockwise direction, the target lateral acceleration Gy is calculated as a negative value. K1 and K2 represents control gains, respectively. The control gain K1 is positive and the control gain K2 is negative. Ds' is set based on the side distance Ds. Specifically, when the target white line is the left white line LL, Ds' is set so as to increase as the side distance Ds becomes smaller, and when the target white line is the right white line LR, Ds' is set so as to decrease as the side distance Ds becomes smaller. For example, when the target white line is the left white line LL, Ds' is set as a value acquired by subtracting the side distance Ds from the deviation determination threshold Dsth (Ds'=Dsth−Ds>0), and when the target white line is the right white line LR, Ds' is set as a value acquired by reversing a sign of a value acquired by subtracting the side distance Ds from the deviation determination threshold Dsth (Ds'=Ds−Dsth<0). It can be said that each of Ds' and the yaw angle θy is an index indicating a degree of deviation from the travelling lane. When the travelling direction of the own vehicle V is on a right side of the reference line Ld, the yaw angle θy is calculated as a positive value, and when the travelling direction of the own vehicle V is on a left side of the reference line Ld, the yaw angle θy is calculated as a negative value.

When the performing condition of the lane deviation suppressing control is satisfied, the ECU 10 may calculate the target lateral acceleration Gy using a following expression instead of the expression (5) mentioned above.

$$Gy = K3 \times Dc + K4 \times \theta y + K5 \times v$$

Here, K3, K4, and K5 represent control gains, respectively. The control gain K3 is positive, the control gain K4 is negative, and the control gain K5 is positive. Dc represents a distance between the position P of the own vehicle V and the reference line Ld in the lane width direction. When the position P is positioned on the left side of the reference line Ld, Dc is calculated as a positive value, and when the position P is positioned on the right side of the reference line Ld, Dc is calculated as a negative value. v represents a curvature. When a road is curving toward a right side with respect to the reference line Ld, the curvature v is calculated as a positive value, and when a road is curving toward a left side with respect to the reference line Ld, the curvature v is calculated as a negative value.

Figure 3:
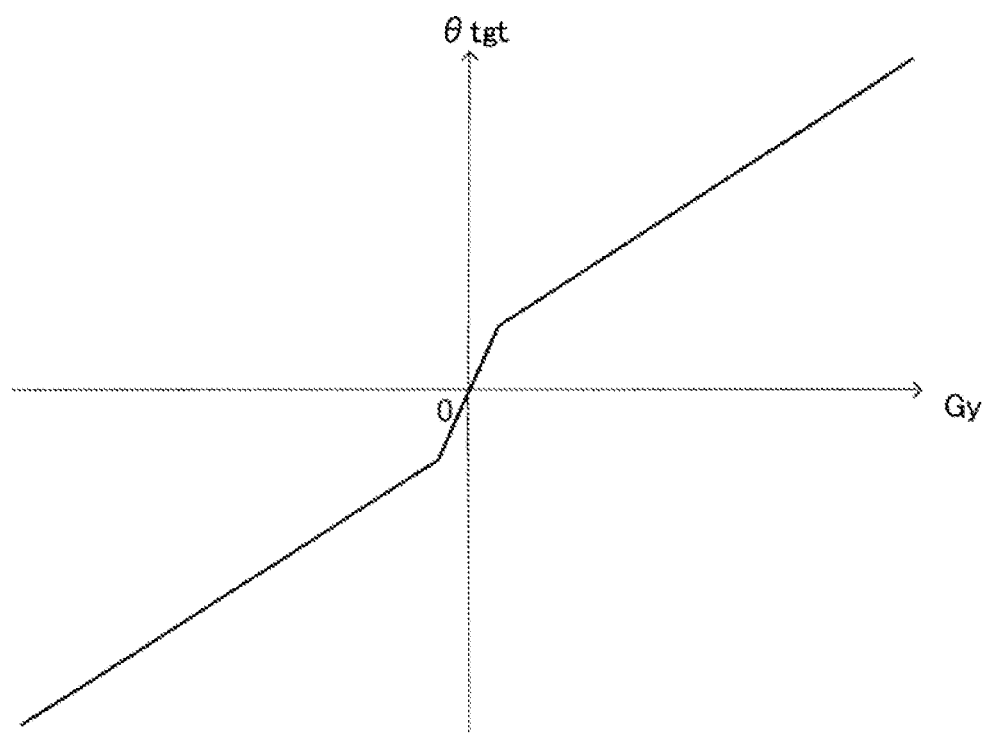
FIG. 3 is a graph showing a target steered angle conversion map regulating a relationship between a target lateral acceleration Gy and a target steered angle θtgt.

FIG. 3 is a target steered angle conversion map regulating a relationship between the target lateral acceleration Gy and a target steered angle θtgt. This target steered angle conversion map is prepared for every vehicle speed in advance and is stored in the ROM of the ECU 10. The ECU 10 calculates, based on the target lateral acceleration Gy and the vehicle speed, a target steered angle θtgt, referring to the target steered angle conversion map, and transmits to the steering ECU 30 the steering instruction indicating this target steered angle θtgt. When the steered wheels are turned to the right with respect to the travelling direction of the own vehicle, the target steered angle θtgt is calculated as a positive value, and when the steered wheels are turned to the left with respect to the travelling direction of the own vehicle, the target steered angle θtgt is calculated as a negative value. When receiving the steering instruction, the steering ECU 30 controls the steered motor 32 in accordance with the target steered angle θtgt to steer the steered wheels. Accordingly, the steered angle of each of the steered wheels is automatically changed (that is, the steering torque is applied to the steering mechanism), and the own vehicle travels in such a manner that the own vehicle will not deviate outside from the white lines of the travelling lane (in other words, the own vehicle travels along the travelling lane).

In addition, when the ECU 10 determines that the own vehicle is highly likely to deviate from the travelling lane and when the ECU 10 determines that the own vehicle has already deviated from the travelling lane, the ECU 10 transmits the warning instruction to the warning ECU 40. When receiving the warning instruction, the warning ECU 40 sounds the buzzer 41 and displays on the display 42 the predetermined message and/or mark. Accordingly, the warning to the driver is conducted.

As is clear from the description above, the performing condition of the lane deviation suppressing control becomes satisfied when Ds<Dsth is satisfied. When the performing condition of the lane deviation suppressing control is satisfied, the ECU 10 executes following processing as the lane deviation suppressing control.

The ECU 10 transmits the steering instruction to the steering ECU 30 such that the steering ECU 30 controls the steered motor 32 in response to the steering instruction.

The ECU 10 transmits the warning instruction to the warning ECU 40 such that the warning ECU 40 controls the buzzer 41 and the display 42 in response to the warning instruction.

Hereinafter, action of the ECU 10 executing the processing above when the performing condition of the lane deviation suppressing control is satisfied may be also referred to as "the ECU 10 performs the lane deviation suppressing control" for convenience sake.

It should be noted that the performing condition of the lane deviation suppressing control is not limited to a case when the side distance Ds is less than the deviation determination threshold Dsth. For example, the ECU 10 may determine that the performing condition of the lane deviation suppressing control becomes satisfied during a predetermined period from a timing when an index value (a deviation index value) is estimated to be larger than a first threshold where the index value is a value which increases as a probability of the own vehicle deviating from the target white line becomes higher. The deviation index value can be calculated as a value which increases as a deviation remaining time becomes shorter, for example. The deviation remaining time can be calculated by dividing a "distance between an edge of the own vehicle at a target white line side and the target white line" by a "speed toward the target white line of the own vehicle in the vehicle width direction".

Subsequently, processing of the ECU 10 concerning the steering override will be described. The steering override is control for, when a steering override condition (described later) becomes satisfied in a case when the driver conducts the steering operation while the collision avoidance braking control and/or the lane deviation suppressing control are/is being performed, finishing a corresponding collision avoidance braking control and/or lane deviation suppressing control to prioritize the steering operation by the driver. The steering override condition becomes satisfied when at least one of following expressions (6) or (7) becomes satisfied.

$$|\theta s| \geq \theta sth \tag{6}$$

$$|\omega s| \geq \omega sth \tag{7}$$

Here, θs represents a steering angle based on the steering operation by the driver. This steering angle θs can be calculated by subtracting a "steered angle acquired based on a rotation angle of the steered motor 32 (or a steered angle detected by a steered angle sensor)" from a "steering angle detected by the steering angle sensor 12". θsth is a threshold (a steering angle threshold) of the steering angle θs, where θsth determines whether the steering override condition is satisfied or not. θsth is set to either an "initial value under an initial state" or a "varied value after cooperative control (mentioned later) is started, where the cooperative control is control for making the lane deviation suppressing control cooperate with the collision avoidance braking control". The initial value of the steering angle threshold θsth is a first steering angle threshold θs1th (θsth=θs1th). ωs is a steering angular speed based on the steering operation by the driver and can be calculated by differentiating the steering angle θs with respect to time. ωsth is a threshold (a steering angular speed threshold) of the steering angular speed ωs, where ωsth determines whether the steering override condition is satisfied or not. ωsth is set to either an "initial value under an initial state" or a "varied value after the cooperative control is started". The initial value of the steering angular speed threshold ωsth is a first steering angular speed threshold ωs1th (ωsth=ωs1th). It should be noted that the steering angle θs and the steering angular speed ωs correspond to one example of "steering related values", the steering angle threshold θsth and the steering angular speed threshold ωsth correspond to one example of "steering related thresholds", and the first steering angle threshold θs1th and the first steering angular speed threshold ωs1th correspond to one example of "first steering related thresholds".

During a period when the collision avoidance braking control and/or the lane deviation suppressing control are/is being performed, the ECU 10 calculates an absolute value of the steering angle θs and an absolute value of the steering angular speed ωs every time the predetermined time elapses and determines whether or not the steering override condition is satisfied. When it is determined that the steering override condition becomes satisfied, the ECU 10 finishes a corresponding control (i.e., a control which is being performed) to prioritize the steering operation by the driver. It should be noted that the first steering angle threshold θs1th and the first steering angular speed threshold ωs1th are both set to relatively small values. Therefore, under the initial state, the steering override condition becomes satisfied relatively easily by the steering operation by the driver. It should be noted that the steering override condition may become satisfied when a condition that a steering torque detected by a steering torque sensor is more than or equal to a predetermined steering torque threshold becomes satisfied.

When the lane deviation suppressing control is being performed in a case when the collision avoidance braking control is about to be performed, the ECU 10 determines whether or not to perform the lane deviation suppressing control in addition to the collision avoidance braking control (strictly, the collision avoidance control) (in other words, to perform the cooperative control). This determination is made based on a result of a direction determination (direction determination processing).

The direction determination is a determination for determining, provided that the steered wheels are turned by the lane deviation suppressing control, whether the own vehicle travels to a direction (collision direction) toward which the own vehicle will collide with the target object or whether the own vehicle travels to a direction (collision avoidance direction) toward which the own vehicle will avoid colliding with the target object. In other words, the direction determination is a determination for determining whether a steered direction of the steered wheels is different from or the same as the collision avoidance direction. When it is determined by the direction determination that the own vehicle travels to the collision direction (that is, the steered direction is different from the collision avoidance direction), the ECU 10 determines that the collision avoidance effect by the collision avoidance braking control may be reduced due to the lane deviation suppressing control, and finishes (stops) the lane deviation suppressing control to perform the collision avoidance braking control. That is, the ECU 10 does not perform the cooperative control. On the other hand, when it is determined by the direction determination that the own vehicle travels to the collision avoidance direction (that is, the steered direction is the same as the collision avoidance direction), the ECU 10 determines that the collision avoidance effect may be improved thanks to the lane deviation suppressing control, and perform both of the collision avoidance braking control and the lane deviation suppressing control. That is, the ECU 10 performs the cooperative control.

Figure 4A:
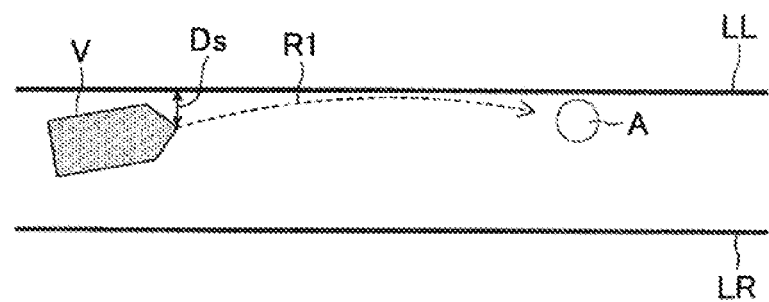
FIG. 4A is a diagram used to describe about a direction determination when a target object is positioned in a lane.
Figure 4B:
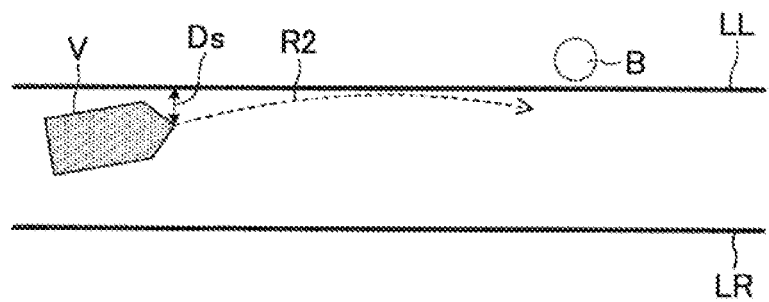
FIG. 4B is a diagram used to describe about the direction determination when the target object is positioned outside the lane.

Here, "whether or not the steered direction of the steered wheels is the same as the collision avoidance direction" in the direction determination is determined based on a positional relationship between the target object and the travelling lane. A specific description will be made referring to FIG. 4A and FIG. 4B. A three-dimensional object A shown in FIG. 4A and a three-dimensional object B shown in FIG. 4B are both three-dimensional objects determined by the collision determination that the own vehicle will collide with, and TTCs to the three-dimensional object A and to the three-dimensional object B are both less than or equal to the braking determination threshold TTCbth. That is, the three-dimensional objects A and B are both target objects, and FIG. 4A and FIG. 4B are diagrams showing situations where the collision avoidance braking control for avoiding collision with the target objects A and B is performed, respectively. In addition, the side distance Ds shown in each of FIG. 4A and FIG. 4B is less than the deviation determination threshold Dsth, and the performing condition of the lane deviation suppressing control is satisfied.

An arrow R1 shown in FIG. 4A and an arrow R2 shown in FIG. 4B both indicate trajectories of the own vehicle V, provided that the cooperative control has been performed. When the lane deviation suppressing control is performed by the cooperative control, the steered wheels are turned in such a manner that the own vehicle V will not deviate outside from the left white line LL. Therefore, according to the trajectory R1 in FIG. 4A, when the target object A is positioned in the travelling lane, the own vehicle V is highly likely to travel to the collision direction. On the other hand, according to the trajectory R2 in FIG. 4B, when the target object B is positioned outside the travelling lane, the own vehicle V is highly likely to travel to the collision avoidance direction.

Thus, the ECU 10 determines, based on the object information, whether or not the target object is positioned in the travelling lane. When it is determined that the target object is positioned in the travelling lane, the ECU 10 determines that the steered direction of the steered wheels is different from the collision avoidance direction, and when it is determined that the target object is positioned outside the travelling lane, the ECU 10 determines that the steered direction of the steered wheels is the same as the collision avoidance direction.

When it is determined by the direction determination that the steered direction is the same as the collision avoidance direction, the lane deviation suppressing control is cooperatively performed with the collision avoidance braking control, and thus the steered wheels are steered. When the steered wheels are turned, the driver tends to rotate (operate) the steering wheel to a direction corresponding to the steered direction of the steered wheels in order to avoid colliding with the target object. In this case, if the steering angle threshold θsth and the steering angular speed threshold ωsth remain as the initial values, respectively, the steering override condition may become satisfied relatively easily by the steering operation by the driver as described above, and as a result, the collision avoidance braking control and the lane deviation suppressing control may be finished halfway (in the middle). In such a case, if the steering operation by the driver is insufficient, a possibility that the own vehicle cannot avoid the collision with the target object becomes high, and thus it is likely that the collision avoidance effect by the collision avoidance braking control and the lane deviation suppressing control cannot be adequately obtained.

Therefore, when it is determined by the direction determination that the steered direction is the same as the collision avoidance direction, the ECU 10 increases the steering angle threshold θsth from the first steering angle threshold θs1th to a second steering angle threshold θs2th (θs2th>θs1th) as well as increases the steering angular speed threshold ωsth from the first steering angular speed threshold ωs1th to a second steering angular speed threshold ωs2th (ωs2th>ωs1th). Accordingly, the steering override condition becomes harder to be satisfied even when the driver conducts the steering operation, and the collision avoidance braking control and the lane deviation suppressing control are highly likely to be performed to the end. Therefore, it can be suppressed that the collision avoidance effect is reduced owing to the steering operation by the driver. The steering angle threshold θsth and the steering angular speed threshold ωsth are initialized after the collision avoidance control or the collision avoidance braking control is finished. It should be noted that the second steering angle threshold θs2th and the second steering angular speed threshold ωs2th correspond to one example of "second steering related thresholds".

When it is determined by the direction determination that the own vehicle travels to the collision direction, the ECU 10 sets a value of a performance stop flag Xk to 1. The performance stop flag Xk is a flag for determining whether or not to stop the lane deviation suppressing control. When a value of the performance stop flag Xk is 1, the ECU 10 does not perform the lane deviation suppressing control even when the performing condition of the lane deviation suppressing control is satisfied (that is, finishes (stops) the lane deviation suppressing control). When a value of the performance stop flag Xk is 0, the ECU 10 performs the lane deviation suppressing control when the performing condition of the lane deviation suppressing control is satisfied (that is, does not finish (stop) the lane deviation suppressing control). However, when the steering override condition mentioned above is satisfied, the ECU 10 finishes the lane deviation suppressing control to prioritize the steering operation by the driver. Once the ECU 10 sets a value of the performance stop flag Xk to 1, the ECU 10 keeps the value of the performance stop flag Xk as 1 until the collision avoidance control or the collision avoidance braking control is finished.

(Actual Operation)

Figure 5:
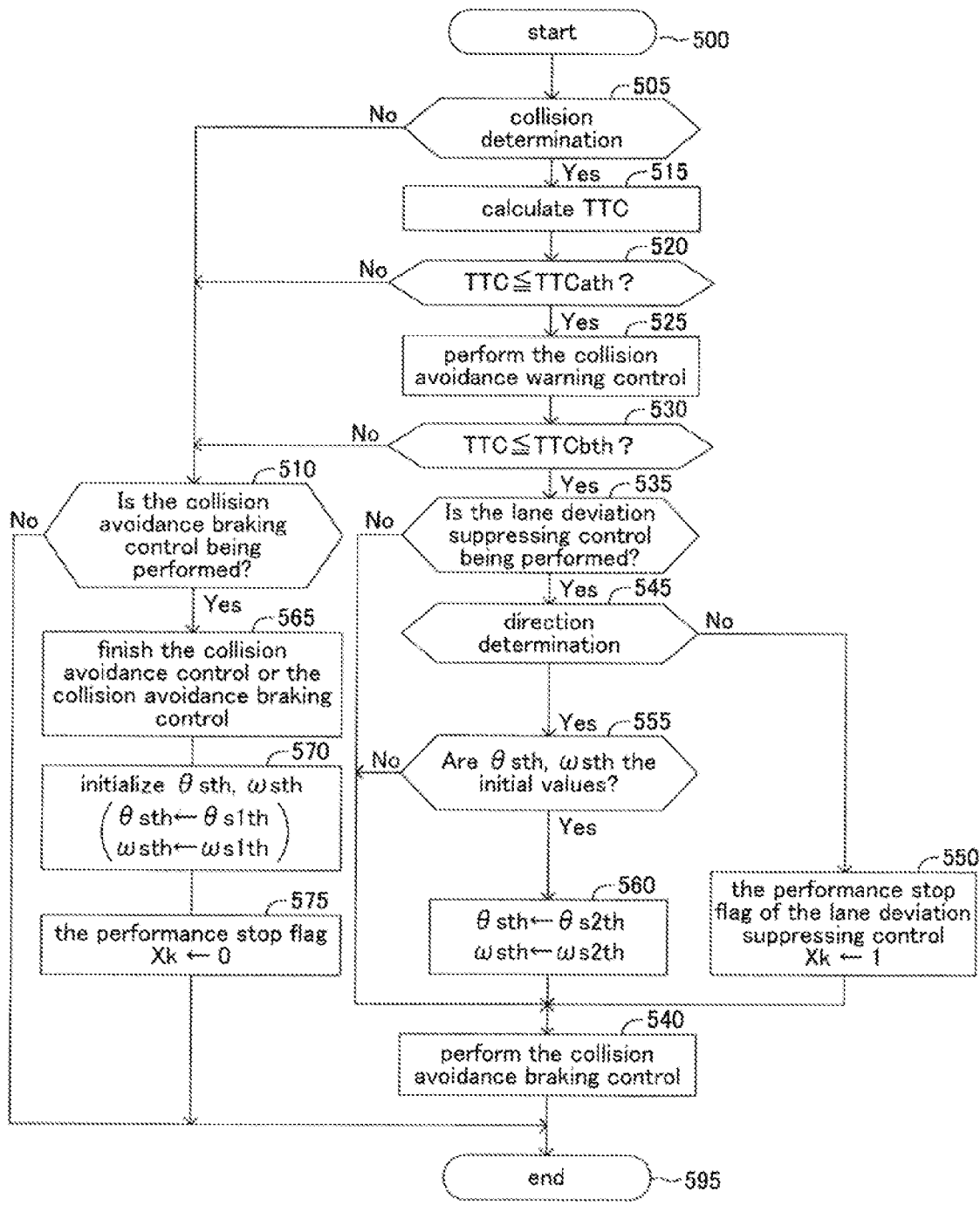
FIG. 5 is a flowchart showing a routine executed by CPU of driving support ECU of the driving support apparatus.
Figure 6:
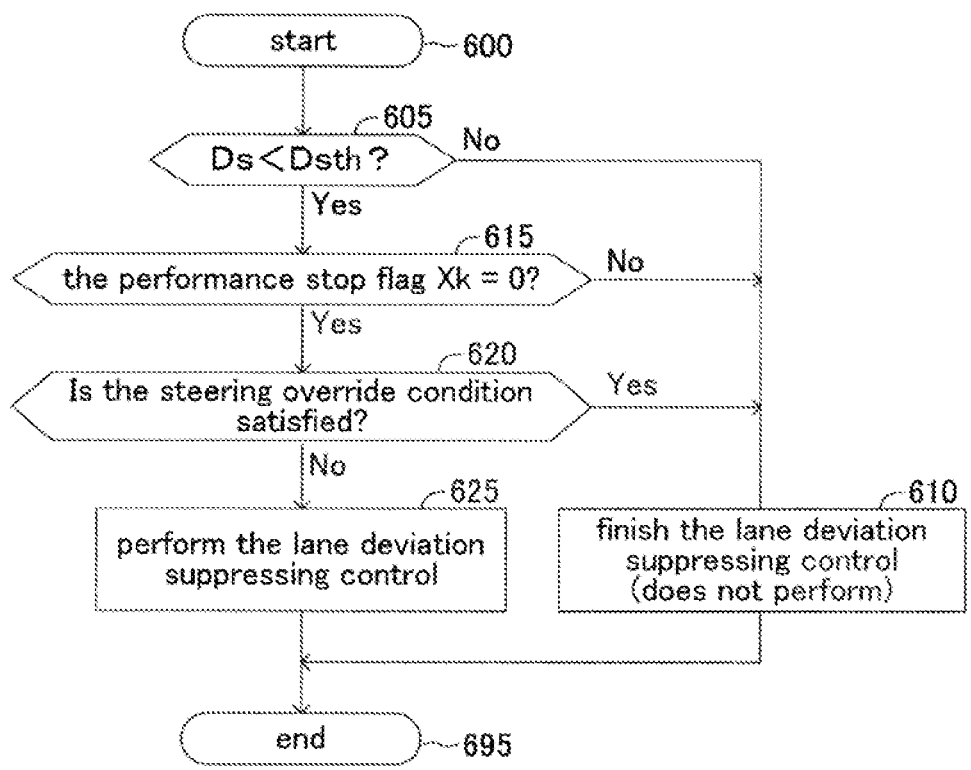
FIG. 6 is a flowchart showing a routine executed by the CPU.
Figure 7:
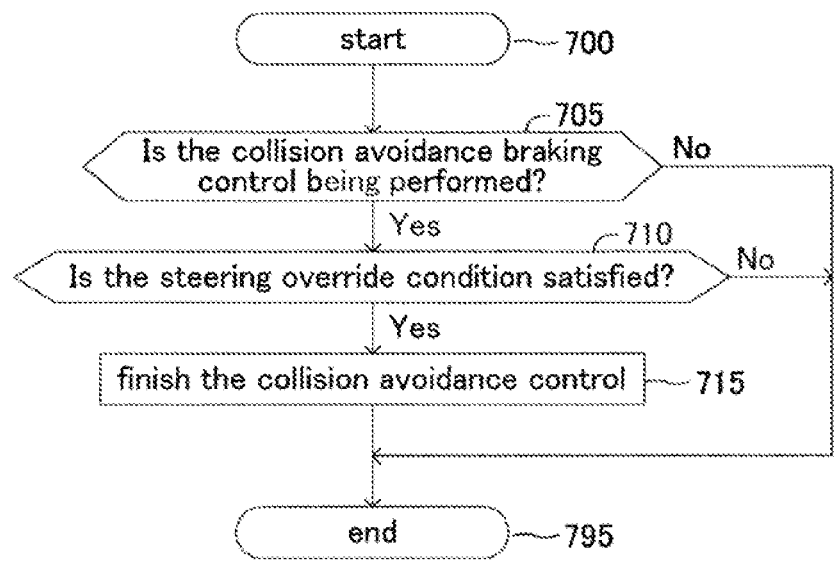
FIG. 7 is a flowchart showing a routine executed by the CPU.

The CPU of the ECU 10 is configured to execute routines shown by flowcharts in FIG. 5 to FIG. 7 in parallel every time the predetermined time elapses during a period where an ignition switch of the own vehicle has been turned on. A description will be made below in order.

When a predetermined timing arrives, the CPU initiates processing from a step 500 in FIG. 5 and proceeds to a step 505 to make the collision determination to determine, based on the position(s) of the three-dimensional object(s) and the trajectory of the own vehicle, whether or not a three-dimensional object exists with which the own vehicle will collide. When the three-dimensional object with which the own vehicle will collide does not exist, the CPU makes a "No" determination at the step 505, and proceeds to a step 510 to determine whether or not the collision avoidance braking control had been performed when the present routine was executed the predetermined time before. When the collision avoidance braking control had not been performed when the present routine was executed the predetermined time before, the CPU makes a "No" determination at the step 510, and proceeds to a step 595 to tentatively terminate the present routine.

On the other hand, when the three-dimensional object with which the own vehicle will collide exists, the CPU makes an "Yes" determination at the step 505, and proceeds to a step 515 to calculate TTC to the three-dimensional object. Thereafter, the CPU proceeds to a step 520 to determine whether or not the TTC is less than or equal to the warning determination threshold TTCath. When the TTC is larger than the warning determination threshold TTCath, the CPU makes a "No" determination at the step 520, and proceeds to the step 510 to make the determination mentioned above.

In contrast, when the TTC is less than or equal to the warning determination threshold TTCath, the CPU makes an "Yes" determination at the step 520, and proceeds to a step 525 to perform the collision avoidance warning control. Subsequently, the CPU proceeds to a step 530 to determine whether or not the TTC is less than or equal to the braking determination threshold TTCbth. When the TTC is larger than the braking determination threshold TTCbth, the CPU makes a "No" determination at the step 530, and proceeds to the step 510 to make the determination mentioned above.

On the other hand, when the TTC is less than or equal to the braking determination threshold TTCbth, the CPU makes an "Yes" determination at the step 530 (that is, determines that the three-dimensional object is a target object), and determines at a step 535 whether or not the lane deviation suppressing control is being performed. When the lane deviation suppressing control is not being performed, the CPU makes a "No" determination at the step 535, and proceeds to a step 540 to perform the collision avoidance braking control. In other words, the CPU performs the collision avoidance control along with the collision avoidance warning control. Thereafter, the CPU proceeds to the step 595 to tentatively terminate the present routine.

In contrast, when the lane deviation suppressing control is being performed, the CPU makes an "Yes" determination at the step 535, and proceeds to a step 545 to make the direction determination. That is, the CPU determines whether or not the steered direction of the steered wheels is the same as the collision avoidance direction. Specifically, the CPU determines whether or not the target object is positioned in the travelling lane based on the object information. When it is determined that the target object is positioned in the travelling lane, the CPU makes a "No" determination at the step 545 (that is, determines that the collision avoidance effect will be reduced owing to the lane deviation suppressing control), and proceeds to a step 550 to set a value of the performance stop flag Xk to 1 and finish (stop) the lane deviation suppressing control. Subsequently, the CPU proceeds to the step 540 to perform the collision avoidance braking control. That is, the cooperative control is not performed. Thereafter, the CPU proceeds to the step 595 to tentatively terminate the present routine.

On the other hand, when it is determined at the step 545 that the target object is positioned outside the travelling lane, the CPU makes an "Yes" determination at the step 545 (that is, determines that the collision avoidance effect will be improved thanks to the lane deviation suppressing control), and proceeds to a step 555 to determine whether or not the steering angle threshold θsth and the steering angular speed threshold ωsth are the initial values (θsth=θs1th, ωsth=ωs1th). When the steering angle threshold θsth and the steering angular speed threshold ωsth are the initial values, the CPU makes an "Yes" determination at the step 555, and at a step 560, increases the steering angle threshold θsth to the second steering angle threshold θs2th as well as increases the steering angular speed threshold ωsth to the second steering angular speed threshold ωs2th. Subsequently, the CPU proceeds to the step 540 to perform the collision avoidance braking control. That is, the cooperative control is performed. Thereafter, the CPU proceeds to the step 595 to tentatively terminate the present routine.

In contrast, when the steering angle threshold θsth and the steering angular speed threshold ωsth are not the initial values, the CPU makes a "No" determination at the step 555 (that is, determines that the processing to increase θsth and ωsth (refer to the step 560) has been already finished), and directly proceeds to the step 540 to perform the collision avoidance control without proceeding to the step 560. That is, the cooperative control is performed. Thereafter, the CPU proceeds to the step 595 to tentatively terminate the present routine.

While the cooperative control is being performed, when the trajectory of the own vehicle has changed by the lane deviation suppressing control, or when the three-dimensional object with which the own vehicle will collide comes not to be detected as a result of the target object having moved, the CPU makes a "No" determination in the collision determination at the step 505, and makes the determination at the step 510. At this point, the cooperative control is being performed and thus the CPU makes an "Yes" determination at the step 510, and proceeds to a step 565 to finish the collision avoidance control. Subsequently, the CPU initializes at a step 570 the steering angle threshold θsth and the steering angular speed threshold ωsth, and proceeds to a step 575 to set a value of the performance stop flag Xk of the lane deviation suppressing control to 0. At this time, when the performing condition of the lane deviation suppressing control is satisfied as well as the steering override condition is not satisfied, the CPU performs the lane deviation suppressing control. Thereafter, the CPU proceeds to the step 595 to tentatively terminate the present routine.

In addition, while the cooperative control is being performed, when a three-dimensional object with which the own vehicle will collide has been detected (step 505: Yes), but the TTC to this three-dimensional object becomes larger than the warning determination threshold TTCath as a result of the cooperative control having been performed or the target object having moved, the CPU makes a "No" determination at the step 520, and makes the determination at the step 510. Thereafter, the CPU executes the processing as mentioned above.

On the other hand, while the cooperative control is being performed, when the collision avoidance warning control is being performed (refer to S525) for a three-dimensional object identified in the collision determination at the step 505, but the TTC to this three-dimensional object becomes larger than the braking determination threshold TTCbth as a result of the cooperative control having been performed or the target object having moved, the CPU makes a "No" determination at the step 530, and makes the determination at the step 510. The CPU makes an "Yes" determination at the step 510, and proceeds to a step 565 to finish the collision avoidance braking control. That is, the CPU continues to perform the collision avoidance warning control. Thereafter, the CPU tentatively terminates the present routine at the step 595, via the step 570 and the step 575.

It should be noted that when a "No" determination is made at the step 505, the step 520, or the step 530 in a case when only the collision avoidance braking control (strictly, the collision avoidance control) is being performed, the CPU makes an "Yes" determination at the step 510, and finishes at the step 565 the collision avoidance control or the collision avoidance braking control. Thereafter, the CPU tentatively terminates the present routine at the step 595, via the step 570 and the step 575.

In parallel with the routine mentioned above, when a predetermined timing arrives, the CPU initiates processing from a step 600 in FIG. 6 and proceeds to a step 605 to determine whether or not the performing condition of the lane deviation suppressing control is satisfied. When the performing condition is not satisfied (Ds≥Dsth), the CPU makes a "No" determination at the step 605, and proceeds to a step 610 to finish the lane deviation suppressing control when this control is currently being performed or to continue not to perform the lane deviation suppressing control when this control is not currently being performed. Thereafter, the CPU proceeds to a step 695 to tentatively terminate the present routine.

On the other hand, when the performing condition of the lane deviation suppressing control is satisfied (Ds<Dsth), the CPU makes an "Yes" determination at the step 605, and proceeds to a step 615 to determine whether or not a value of the performance stop flag Xk is 0. When the value of the performance stop flag Xk is 1, the CPU makes a "No" determination at the step 615, and proceeds to a step 610 to finish the lane deviation suppressing control when this control is currently being performed or to continue not to perform the lane deviation suppressing control when this control is not currently being performed. Thereafter, the CPU proceeds to the step 695 to tentatively terminate the present routine.

In contrast, when the value of the performance stop flag Xk is 0, the CPU makes an "Yes" determination at the step 615, and proceeds to a step 620 to determine whether or not the steering override condition is satisfied. When the steering override condition is satisfied, the CPU makes an "Yes" determination at the step 620, and proceeds to a step 610 to finish the lane deviation suppressing control when this control is currently being performed or to continue not to perform the lane deviation suppressing control when this control is not currently being performed. Thereafter, the CPU proceeds to the step 695 to tentatively terminate the present routine.

On the other hand, when the steering override condition is not satisfied, the CPU makes a "No" determination at the step 620, and proceeds to a step 625 to perform the lane deviation suppressing control. Thereafter, the CPU proceeds to the step 695 to tentatively terminate the present routine.

In parallel with the routine mentioned above, when a predetermined timing arrives, the CPU initiates processing from a step 700 in FIG. 7 and proceeds to a step 705 to determine whether or not the collision avoidance braking control is being performed. When the collision avoidance braking control is not being performed, the CPU makes a "No" determination at the step 705, and proceeds to a step 795 to tentatively terminate the present routine.

On the other hand, when the collision avoidance braking control is being performed, the CPU makes an "Yes" determination at the step 705, and proceeds to a step 710 to determine whether or not the steering override condition is satisfied. When the steering override condition is satisfied, the CPU makes an "Yes" determination at the step 710 to finish the collision avoidance braking control currently being performed. Thereafter, the CPU proceeds to the step 795 to tentatively terminate the present routine.

In contrast, when the steering override condition is not satisfied, the CPU makes a "No" determination at the step 710, and proceeds to the step 795 to tentatively terminate the present routine. That is, the CPU continues to perform the collision avoidance braking control currently being performed.

Effects of the present embodiment apparatus will be described. In the present embodiment apparatus, when the lane deviation suppressing control is being performed in a case when the collision avoidance braking control is about to be performed, the direction determination is made, and based on a determination result thereof, whether or not to perform the cooperative control is determined. Specifically, when it is determined by the direction determination that the steered direction is different from the collision avoidance braking control, the cooperative control is not performed, whereas when it is determined that the steered direction is the same as the collision avoidance braking control, the cooperative control is performed. According to this configuration, the collision avoidance effect can be improved by making use of the lane deviation suppressing control while suppressing a possibility that the collision avoidance effect is reduced owing to the lane deviation suppressing control, and it becomes possible to make the lane deviation suppressing control properly cooperate with the collision avoidance braking control.

Especially, in the present embodiment apparatus, the direction determination is made by determining whether or not the steered direction of the steered wheels is the same as the collision avoidance direction based on the determination result of whether or not the target object is positioned in the travelling lane. Therefore, the direction determination can be properly made.

In addition, whether or not the target object is positioned in the travelling lane can be precisely determined based on the object information. Therefore, the direction determination can be made based on a clear criterion.

Figure 8:
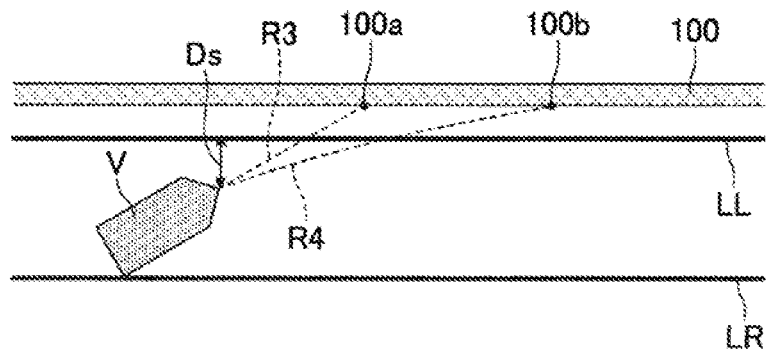
FIG. 8 is a diagram used to describe an effect brought by cooperative control.
Figure 9:
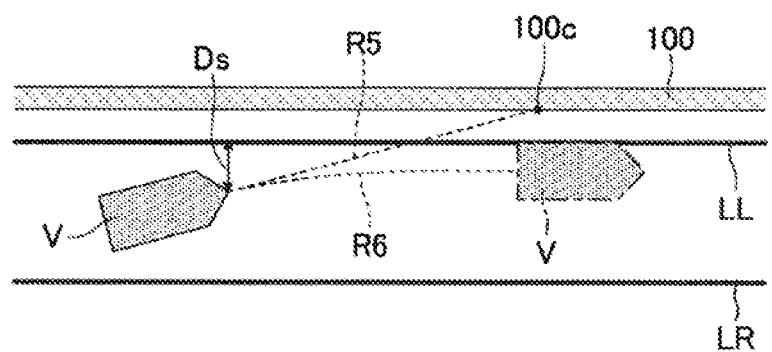
FIG. 9 is a diagram used to describe an effect brought by the cooperative control.

Moreover, the present embodiment apparatus is especially useful when avoiding the collision or reducing the impact of the collision with a fixed object (for example, a guardrail or a sidewall) extending along the lane on the outside of the lane. A specific description will be made referring to FIG. 8 and FIG. 9. As shown in FIG. 8 and FIG. 9, on the outside of the travelling lane of the own vehicle V (on the outside of the left white line LL), a guardrail 100 is extending along the travelling lane. In addition, the performing condition of the lane deviation suppressing control is satisfied in both cases (Ds<Dsth).

In FIG. 8, the present embodiment apparatus recognizes a part 100a of the guardrail 100 as a target object (hereinafter, may be also referred to as a "target object 100a"), and is about to perform the collision avoidance braking control for avoiding the collision with the target object 100a. A dashed line R3 is a trajectory of the own vehicle V calculated based on the yaw rate and the vehicle speed at a current timing. A length of the trajectory R3 is substantially equal to the shortest distance from the own vehicle V to the target object 100a. According to a conventional configuration to prioritize the collision avoidance braking control over the lane deviation suppressing control, the own vehicle V travels straightforward along the trajectory R3, and thus the target deceleration becomes relatively large, resulting in a possible burden on the driver and other passengers.

In contrast, the present embodiment apparatus performs the cooperative control because the target object 100a is positioned outside the travelling lane. A dashed line R4 is a trajectory of the own vehicle V when the cooperative control is performed. When the lane deviation suppressing control is performed by the cooperative control, the yaw angle θy (illustration is omitted in FIG. 8) becomes small, and therefore the present embodiment apparatus comes to recognize a part 100b positioned farther from the part 100a as a target object. That is, a trajectory of the own vehicle V changes from the trajectory R3 to the trajectory R4 by the cooperative control, and thereby a distance to the target object becomes longer. Hence, compared with the conventional configuration, the target deceleration in the collision avoidance braking control becomes moderate, resulting in reducing a burden on the driver and the passengers. Besides, even in a situation where a vehicle could only reduce the impact of the collision according to a conventional configuration, a possibility that the own vehicle can avoid the collision becomes higher.

In FIG. 9, the present embodiment apparatus recognizes a part 100c of the guardrail 100 as a target object (hereinafter, may be referred to as a "target object 100c"), and is about to perform the collision avoidance braking control for avoiding the collision with the target object 100c. A dashed line R5 is a trajectory of the own vehicle V calculated based on the yaw rate and the vehicle speed at the current timing. According to the conventional configuration, the own vehicle V travels straightforward along the trajectory R5, and thus the own vehicle V is highly likely to cross the left white line LL in the middle of the collision avoidance braking control.

In contrast, the present embodiment apparatus performs the cooperative control because the target object 100c is positioned outside the travelling lane. A dashed line R6 is a trajectory of the own vehicle V when the cooperative control is performed. The lane deviation suppressing control is performed along the trajectory R6 by the cooperative control, and thereby it becomes possible that the own vehicle V avoids the collision with the target object 100c without crossing the left white line LL.

As described above, according to the present embodiment apparatus, the lane deviation suppressing control is made to properly cooperate with the collision avoidance braking control, and thereby it becomes possible to especially efficiently avoid the collision or reduce the impact of the collision with the guardrail, the sidewall, and the like.

The driving support apparatus according to the present embodiment has been described. However, the present invention is not limited thereto and may adopt various modifications within a scope of the present invention.

For example, in the present embodiment, when it is determined by the direction determination that the steered direction of the steered wheels is the same as the collision avoidance direction, the processing of increasing θsth and ωsth is executed. However, this processing may be omitted. That is, the processing at the step 555 and the step 560 is not mandatory in the routine shown in FIG. 5, and the CPU may directly proceed to the step 540 when an "Yes" determination is made at the step 545. According to this configuration as well, it becomes possible to make the lane deviation suppressing control properly cooperate with the collision avoidance braking control.

In addition, in the present embodiment, the direction determination is made by determining whether or not the steered direction is the same as the collision avoidance direction based on whether or not a target object is positioned in the travelling lane. However, the direction determination may be made based on other criteria. For example, calculate a trajectory of the own vehicle when the cooperative control is assumed to be performed, and based on a position of the target object and this trajectory, the direction determination may be made.

Further, at the step 535 in FIG. 5, the CPU may determine whether or not the performing condition of the lane deviation suppressing control (Ds<Dsth) is satisfied.

The invention claimed is:

1. A driving support apparatus comprising:
   a radar sensor and a camera sensor configured to detect a three-dimensional object present in front of an own vehicle and a lane on which said own vehicle is travelling and to acquire information indicating said detected three-dimensional object and lane as object information; and
   a controller configured to perform collision avoidance braking control for automatically applying braking force to said own vehicle when it is determined, based on said object information, that said own vehicle is highly likely to collide with said detected three-dimensional object and lane deviation suppressing control for automatically changing a steered angle of steered wheels of said own vehicle such that said own vehicle travels in said lane when a deviation suppressing control performing condition is satisfied, said deviation suppressing control performing condition being a condition satisfied when it is determined, based on said object information, that said own vehicle is highly likely to deviate from said detected lane and/or a condition satisfied when it is determined, based on said object information, that said own vehicle has deviated from said detected lane,
   wherein,
   said controller is configured to:
   when said deviation suppressing control performing condition is satisfied in a case when it is determined that said own vehicle is highly likely to collide with said detected three-dimensional object, execute direction determination processing for determining, provided that said steered wheels are turned by said lane deviation suppressing control, whether said own vehicle travels to a direction toward which said own vehicle will collide with said three-dimensional object or said own vehicle travels to a collision avoidance direction toward which said own vehicle will avoid colliding with said three-dimensional object,
   when it is determined that said own vehicle travels to said direction toward which said own vehicle will collide with said three-dimensional object and a collision avoidance effect will be reduced due to said lane deviation suppressing control, stop said lane deviation suppressing control and perform said collision avoidance braking control, and
   when it is determined that said own vehicle travels to said collision avoidance direction and said collision avoidance effect will be improved due to said lane deviation suppressing control, perform both of said collision avoidance braking control and said lane deviation suppressing control.

2. The driving support apparatus according to claim 1 further comprising a steering index value detector for detecting steering related values having correlation with force input to a steering wheel by a driver of said own vehicle,
   wherein,
   said controller is configured to, when a steering override condition where said steering related values are more than or equal to predetermined steering related thresholds while said collision avoidance braking control and/or said lane deviation suppressing control are/is being performed becomes satisfied, perform steering override for finishing said corresponding collision avoidance braking control and/or lane deviation suppressing control to prioritize steering operation by said driver,
   said controller further sets said steering related thresholds to first steering related thresholds, and
   when it is determined in said direction determination processing that said own vehicle travels to said collision avoidance direction, said controller is configured to change said steering related thresholds to second steering related thresholds larger than said first steering related thresholds.

3. The driving support apparatus according to claim 1, wherein,
   said controller is configured to, in said direction determination processing,:
   determine, based on said object information, whether or not said detected three-dimensional object is positioned in said detected lane,
   when it is determined that said detected three-dimensional object is positioned in said lane, determine that said own vehicle travels to said direction toward which said own vehicle will collide with said three-dimensional object, and
   when it is determined that said detected three-dimensional object is positioned outside said lane, determine that said own vehicle travels to said collision avoidance direction.

4. The driving support apparatus according to claim 2, wherein,
   said controller is configured to, in said direction determination processing:
   determine, based on said object information, whether or not said detected three-dimensional object is positioned in said detected lane,
   when it is determined that said detected three-dimensional object is positioned in said lane, determine that own vehicle travels to said direction toward which said own vehicle will collide with said three-dimensional object, and
   when it is determined that said detected three-dimensional object is positioned outside said lane, determine that said own vehicle travels to said collision avoidance direction.

* * * * *